Aug. 7, 1934.  J. C. WARDEN  1,969,438
TIRE BEAD AND METHOD OF MAKING TIRES
Filed March 25, 1933   2 Sheets-Sheet 1

Inventor
James C. Warden

By
Attorney

Aug. 7, 1934.  J. C. WARDEN  1,969,438
TIRE BEAD AND METHOD OF MAKING TIRES
Filed March 25, 1933  2 Sheets-Sheet 2

Inventor
James C. Warden
By
Attorney

Patented Aug. 7, 1934

1,969,438

UNITED STATES PATENT OFFICE 1,969,438

TIRE BEAD AND METHOD OF MAKING TIRES

James C. Warden, Akron, Ohio, assignor to Wingfoot Corporation, Wilmington, Del., a corporation of Delaware Application March 25, 1933, Serial No. 662,759

22 Claims. (Cl. 154—14)

This invention relates to improvements in the construction of pneumatic tires and more particularly it relates to improvements in bead structure for such tires, and to the material with which a tire bead is wrapped prior to its incorporation in a tire casing.

In the construction of pneumatic tire casings having inextensible beads therein, it is customary to form such beads of a plurality of coiled loops of steel wire or other similar inextensible material. This wire usually either is imbedded in a rubber compound, whereby the wire is insulated or coated as a whole, or the wire and rubber are in the form of a tape, or each wire strand is provided with a separate coating of rubber. In either case, the rubber is adapted to adhere to the wire during the cure of the tire and to form a union between the wire and the bead cover.

When tire casings, which have bead wire therein coated with green or uncured rubber, are cured, the pressure required in the mold during the curing operation changes the original cross-sectional shape of the coiled bead. For example, if the bead before curing is substantially rectangular, this pressure changes it into an approximate oval or pear shape, and beads of other shapes are changed in a similar manner. In this readjustment of the bead material, due to the curing pressure, the rubber coating or insulation migrates and the outer wires of the bead tend to squeeze through the coating and contact with the fabric in the flipper strip surrounding the bead, which subjects these wires to at least two detrimental conditions. The first condition is that these wires contacting with adjacent flipper fabric are exposed to moisture and air in the fabric, and secondly, a chafing action is caused by the infinitesimal motion of the flipper fabric against these wires, thereby starting separation of the fabric and exposure of the wire. Both of these conditions will eventually cause rust and this rust will progress through the bead, resulting in substantial damage to the tire.

Several methods have been proposed to prevent rusting of the bead, among which is a method which involves wrapping the green bead with a rubber-coated fabric cover and semi-curing the wrapped bead in open heat before it is incorporated in a tire. This method has been unsatisfactory because in good bead construction it is essential to provide a strong union between the bead wire and the coating with which the wire is insulated. A considerable amount of pressure is required to obtain this union, and the curing pressure used in vulcanizing a complete tire casing is sufficient for this purpose. However, this degree of pressure cannot be made to assist the rubber-to-metal union when the wrapped beads are semi-cured in open heat, and therefore, this lack of pressure in open heat curing is exceptionally detrimental to the rubber-to-metal union.

Likewise, pressure is necessary to effect a strong union between the bead-wrapping material and the rubber insulation around the wires. When a covered bead is semi-cured in open heat, it is impossible to maintain the pressure necessary to obtain a good union between the bead wrap and the wire coating. Furthermore, an open heat semi-cure of wrapped beads frequently rusts the bead wire due to exposure of some points thereof to the steam or air, whichever heating medium is used. The exposed points on the wire are caused by gaps which frequently occur between the edges of the bead cover. Also, there is a certain amount of air trapped in the rubber coating of the wires which will have no chance to escape when the wrapped bead is cured in open heat. This air has proven to be a source of rust.

I have found that a substantially rust-proof bead structure can be provided if the green bead is enclosed in a semi-cured, or substantially fully cured rubber-coated cover before incorporation into a tire carcass and before the curing pressure is applied to the carcass. This green bead with its semi-cured, or fully cured, cover is then enclosed with the customary flipper strip, and these elements are incorporated into a tire casing in the usual manner, after which the casing is vulcanized as customary.

Hence, it is an object of this invention to provide a substantially rust-proof bead structure of the character referred to.

Another object is to improve the method of making pneumatic tires wherein inextensible beads are utilized.

A further object is to establish an appreciable rubber layer between the fabric and the wire to prevent rust and to absorb any relative motion which might take place between the fabric and the wire, thus relieving the strain on the rubber-to-metal union.

A further object is to provide a novel cover for an inextensible bead core which will effectively prevent the formation of rust in a tire casing wherein the covered bead is used.

The foregoing and other objects and advantages of the invention will become apparent from the following description taken in connection with the accompanying drawings, wherein Fig. 1 is a perspective view of a covered bead constructed in accordance with this invention;

Figure 2:
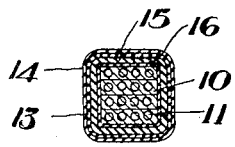
Fig. 2 is a section taken substantially on line II—II of Fig. 2.

Referring to Fig. 2 of the drawings, the numeral 10 indicates a green or uncured bead which is formed of a plurality of strands of steel wire 11, or other suitable inextensible material. The wire 11 is coated in any suitable manner, such as by the process illustrated in Patent No. 1,633,620, granted to S. W. Alderfer, whereby a flat tape of the rubber and wires is formed, which tape is wound into a plurality of layers until a bead annulus is formed thereby. In this instance, four strands of wire are utilized in each layer of tape, and four layers of tape are deemed sufficient to form a suitable bead annulus. It will be understood that the steel wires may be coated in any other manner and the use of the tape is by no means compulsory.

After the bead annulus has been formed, it preferably is wrapped in a semi-cured, rubber-coated fabric cover, indicated as a whole by the numeral 12, but this cover may be substantially fully cured if desired. This cover is constructed with a layer of fabric 13 preferably, but not necessarily, of open weave and light gauge, which is provided on its outer surface with a skim coat 14 of slow-curing rubber compound. On its inner surface the fabric layer is coated with a relatively thick coat 15 of fast-curing rubber compound, and the inner surface of the latter is given a skim coat 16 of slow-curing rubber compound.

Figure 4:
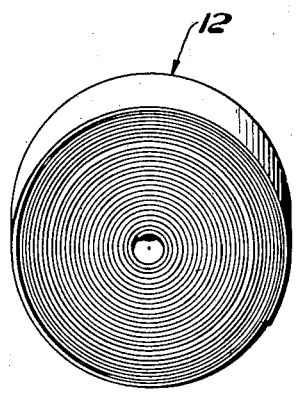
Fig. 4 is a perspective view of a roll of the material used in covering the bead.

The fabric may be coated as described by any suitable means and I have found that a calendar is best suited for this purpose. After coating, the fabric is wound into a relatively wide roll having a liner of "holland" or other suitable material. This roll is placed in a curing oven wherein it is semi-cured. After semi-curing, the roll is cut into a plurality of small rolls of the desired width for bead wrapping, and such a small roll is shown in Fig. 4. In preparing these small rolls the liner material preferably is removed and the small rolls are wound up without a liner.

While the cover is being semi-cured, the layer of fast-curing rubber is cured to the point where it is no longer plastic and is only slightly elastic, but it does not receive its complete cure until it is cured with a tire in which it is incorporated. This fast-curing compound is prepared with an accelerator in any well known manner so that when properly semi-cured the compound will not flow appreciably during the process of final cure. As herein stated, the cover may be substantially fully cured and by this it is meant that the fast-curing compound may be fully cured, but the slow-curing compounds remain tacky to permit union during the tire cure.

The layers of slow-curing rubber compound are prepared in any well known manner whereby they are not cured sufficiently to prevent flowing during final cure, and consequently remain tacky to form a union with adjacent stock until they are fully cured with a tire casing in which they are incorporated.

As a result of this combination of material forming the bead cover, a cover is provided which has a semi-cured or fully cured layer of rubber for insulation purposes, fabric to mechanically retain the wires, and tacky surfaces for union in the tire with which the bead is used.

Figure 1:
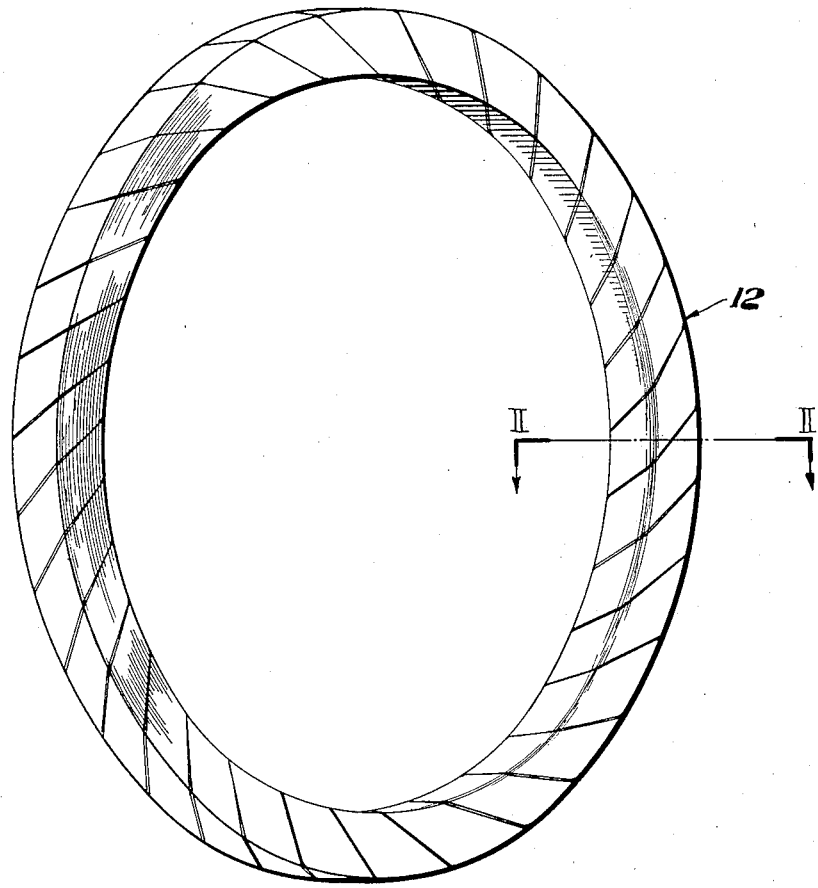

In wrapping the bead annulus with the cover, I prefer to use a spiral wrap such as is shown in Fig. 1, avoiding any overlapping of the edges of the cover. It will be noted that in avoiding overlapping of the edges small spaces are left between the edges, but these spaces will be filled with rubber from the insulation around the wires when pressure is applied during cure of the tire with which the bead structure is incorporated. However, I do not limit myself to this form of wrap, as any desired wrap may be used. After the bead is covered, it is provided with a flipper covering, incorporated with the flipper into a tire casing and vulcanized with the casing, all in the usual manner.

Figure 3:
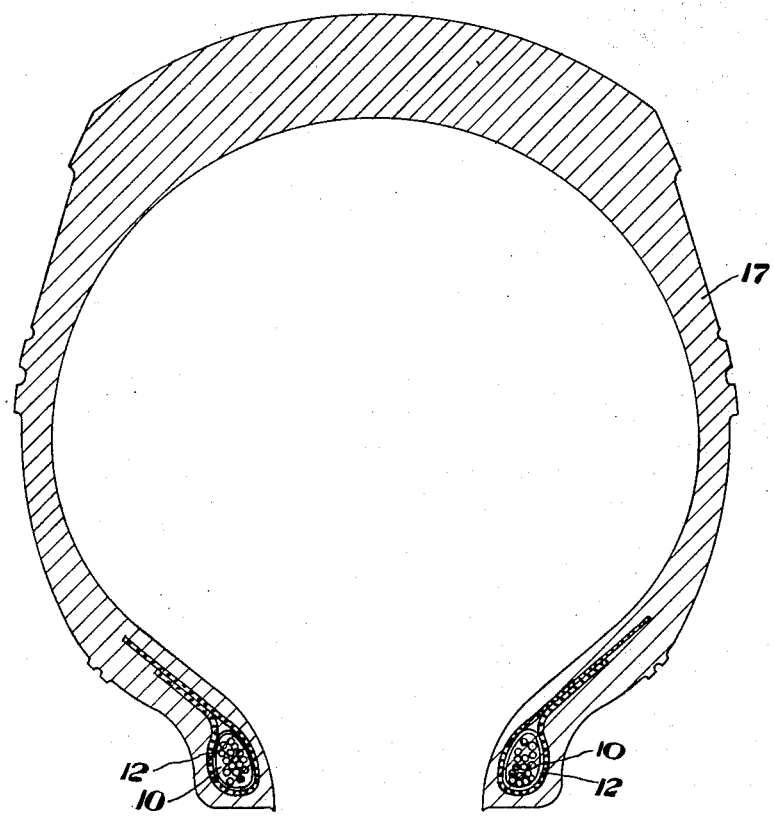
Fig. 3 is a reduced section of a cured tire casing having my bead structure incorporated therein.

In Fig. 3, I have shown the condition of the bead in a cured tire 17. The curing pressure has changed the shape of the bead from substantially rectangular to an oval or pear shape and has forced the wire insulation to fill and thereby seal all spaces between the edges of the spirally wrapped cover. During the tire cure the cover 12 has maintained its proper enclosing relation with respect to the bead, and will effectively prevent, during use of the tire, any rusting of the bead and any chafing due to infinitesimal relative movement between the fabric and wires, because the now fully cured rubber, which has not appreciably thinned out during the final cure, entirely surrounds the wires and prevents any contact with fabric.

Figure 5:
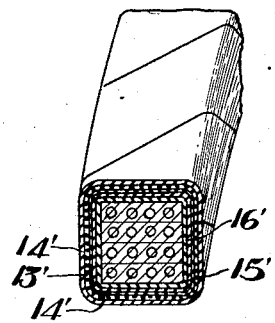
Fig. 5 is a partial perspective of a modified form of covering material for the bead.

In Fig. 5, I have shown a modified form of cover wherein both sides of the fabric 13' are skim-coated with a layer 14' of slow-curing rubber, a layer 15' of fast-curing rubber being arranged next to the inner layer 14', and a layer 16' of slow-cured rubber being arranged inwardly of layer 15'. Sometimes it is more convenient to initially cover both sides of the fabric simultaneously with the slow-cure rubber, and the form of cover shown in Fig. 5 is to be used under such conditions. This modified form of wrap is semi-cured or fully cured, wrapped on the bead annulus and incorporated in a tire in the same manner as the form shown in Fig. 2.

Figure 6:
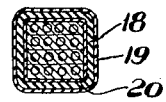
Fig. 6 is a cross-section showing another modified form of covering for the bead.

In Fig. 6 I have shown an additional modified form of cover for the bead in which the fabric is eliminated. This form of cover comprises a relatively thick layer of fast-curing rubber compound 18 similar to layer 15 in Fig. 2, an outer coating 19 of slow-curing rubber on layer 18, and an inner coating 20 of slow-curing rubber on said layer. The use of fabric in the cover is not essential but is preferred at this time, although excellent results can be obtained without using the fabric. The form of cover shown in Fig. 6 is semi-cured or fully cured, wrapped on the bead annulus and incorporated in a tire in the same manner as the form illustrated in Fig. 2.

Although I have illustrated the preferred manner in which my invention is to be practiced, it will be apparent to those skilled in the art that various modifications may be made without departing from the spirit of the invention or from the scope of the sub-joined claims.

What I claim is:

1. The method of making a pneumatic tire casing which comprises providing a bead core annulus of inextensible material coated with a rubber compound, curing a rubber cover for said core at least to the point of semi-cure, enclosing said core in said cover, incorporating the resulting covered core in a tire casing, and vulcanizing said casing.

2. The method of making a pneumatic tire casing which comprises providing a bead core annulus of inextensible material coated with a rubber compound, curing a rubber cover having a relatively thick layer of fast-curing rubber compound at least to the point of semi-cure, enclosing said core in said cover, incorporating the resulting covered core in a tire casing, and vulcanizing said casing.

3. The method of making a pneumatic tire casing which comprises providing a bead core annulus of inextensible material coated with a rubber compound, curing a rubber-coated fabric cover for said core at least to the point of semi-cure, enclosing said core in said cover, incorporating the resulting covered core in a tire casing, and vulcanizing said casing.

4. The method of making a pneumatic tire casing which comprises providing a bead core of inextensible material coated with a rubber compound, curing a rubber-coated fabric cover at least to the point of semi-cure, said cover having a coating of a slow-curing rubber compound adapted to engage said core coating, enclosing said core in said cover, incorporating the resulting covered core in a tire casing, and vulcanizing said casing.

5. The method of making a pneumatic tire casing which comprises providing a bead core of inextensible material coated with a rubber compound, curing a rubber-coated fabric cover at least to the point of semi-cure, said cover having an inner coating of a slow-curing rubber compound adapted to engage said core coating and having an outer coating of a slow-curing rubber compound, enclosing said core in said cover, incorporating the resulting covered core in a tire casing, and vulcanizing said casing.

6. The method of making a pneumatic tire casing which comprises providing a bead core of inextensible material coated with a rubber compound, providing a fabric cover coated externally with a slow-curing rubber compound and coated internally with a fast-curing rubber compound, said latter compound having an inner coating of slow-curing rubber adapted to engage said core coating, curing said coated cover at least to the point of semi-cure, enclosing said core in said cover, incorporating the resulting covered core in a tire casing, and vulcanizing said casing.

7. The method of making a pneumatic tire casing which comprises providing a bead core of inextensible material coated with a rubber compound, providing a fabric cover coated externally and internally with a slow-curing rubber compound, said internal coating having an inner coating of fast-curing rubber compound, said latter compound having an inner coating of slow-curing rubber adapted to engage said core coating, curing said coated cover at least to the point of semi-cure, enclosing said core in said cover, incorporating the resulting covered core in a tire casing, and vulcanizing said casing.

8. The steps in the method of making a pneumatic tire casing which comprise providing a bead core of inextensible material coated with a rubber compound, curing a rubber cover for said core at least to the point of semi-cure, and enclosing said core in said cover.

9. The steps in the method of making a pneumatic tire casing which comprise providing a bead core of inextensible material coated with a rubber compound, curing a rubber cover having a relatively thick layer of fast-curing rubber compound at least to the point of semi-cure, and enclosing said core in said cover.

10. The steps in the method of making a pneumatic tire casing which comprise providing a bead core of inextensible material coated with a rubber compound, curing a rubber-coated fabric cover for said core at least to the point of semi-cure, and enclosing said core in said cover.

11. The steps in the method of making a pneumatic tire casing which comprise providing a bead core annulus of inextensible material coated with a rubber compound, curing a rubber-coated fabric cover at least to the point of semi-cure, said cover having a coating of a slow-curing rubber compound adapted to engage said core coating, and enclosing said core in said cover.

12. The steps in the method of making a pneumatic tire casing which comprise providing a bead core annulus of inextensible material coated with a rubber compound, curing a rubber-coated fabric cover at least to the point of semi-cure, said cover having an inner coating of a slow-curing rubber compound adapted to engage said core coating and having an outer coating of a slow-curing compound, and enclosing said core in said cover.

13. The steps in the method of making a pneumatic tire casing which comprise providing a bead core of inextensible material coated with a rubber compound, providing a fabric cover coated externally with a slow-curing rubber compound and coated internally with a fast-curing rubber compound, said latter compound having an inner coating of slow-curing rubber compound adapted to engage said core coating, curing said coated cover at least to the point of semi-cure, and enclosing said core in said cover.

14. The steps in the method of making a pneumatic tire casing which comprise providing a bead core annulus of inextensible material coated with a rubber compound, providing a fabric cover coated externally and internally with a slow-curing rubber compound, said internal coating having an inner coating of fast-curing rubber compound, said latter compound having an inner coating of slow-curing rubber adapted to engage said core coating, curing said coated cover at least to the point of semi-cure, and enclosing said core in said cover.

15. A bead structure for a pneumatic tire comprising an inextensible annulus coated with an uncured rubber compound, and a rubber cover enclosing said annulus, said cover being cured at least to the point of semi-cure.

16. A bead structure for a pneumatic tire comprising an inextensible annulus coated with an uncured rubber compound, and a rubber cover having a relatively thick layer of fast-curing rubber compound enclosing said annulus, said fast-curing compound being cured at least to the point of semi-cure.

17. A bead structure for a pneumatic tire comprising an inextensible annulus coated with an uncured rubber compound, and a rubber-coated fabric cover enclosing said annulus, said cover being cured at least to the point of semi-cure.

18. A bead structure for a pneumatic tire comprising an inextensible annulus coated with an uncured rubber compound, and a rubber-coated fabric cover enclosing said annulus and cured at least to the point of semi-cure, said cover having a coating of slow-curing rubber engaging said annulus coating.

19. A bead structure for a pneumatic tire comprising an inextensible annulus coated with an uncured rubber compound, and a rubber-coated fabric cover enclosing said annulus and cured at least to the point of semi-cure, said cover having an inner coating of slow-curing rubber engaging said annulus coating and having an external coating of slow-curing rubber.

20. A bead structure for a pneumatic tire comprising an inextensible annulus coated with an uncured rubber compound, and a cover enclosing said annulus and cured at least to the point of semi-cure, said cover comprising fabric coated externally with a slow-curing rubber compound and coated internally with a fast-curing rubber compound, said latter compound having an inner coating of slow-curing rubber adapted to engage said annulus coating.

21. A bead structure for a pneumatic tire comprising an inextensible annulus coated with an uncured rubber compound and a cover enclosing said annulus and cured at least to the point of semi-cure, said cover comprising fabric coated externally and internally with a slow-curing rubber compound, said internal coating having an inner coating of fast-curing rubber compound, said latter compound having an inner coating of slow-curing rubber adapted to engage said annulus coating.

22. A cover for an inextensible bead element adapted to be incorporated in a pneumatic tire comprising a relatively thick fast-curing rubber compound having slow-curing rubber compound associated therewith for union with the bead element and with the tire casing elements, said fast-curing compound being in at least a semi-cured condition before association with the bead element.

JAMES C. WARDEN.